(12) United States Patent
Park et al.

(10) Patent No.: US 12,434,200 B2
(45) Date of Patent: Oct. 7, 2025

(54) METHOD FOR MANUFACTURING ULTRA-THIN POLYMER SEPARATION MEMBRANE BY USING LOW-TEMPERATURE COATING

(71) Applicant: IUCF-HYU (Industry-University Cooperation Foundation Hanyang University), Seoul (KR)

(72) Inventors: Ho Bum Park, Seoul (KR); Tae Hoon Lee, Daejeon (KR); Si Hyun Do, Seoul (KR)

(73) Assignee: IUCF-HYU (Industry-University Cooperation Foundation Hanyang University), Seoul (KR)

( * ) Notice: Subject to any disclaimer, the term of this patent is extended or adjusted under 35 U.S.C. 154(b) by 379 days.

(21) Appl. No.: 18/042,671

(22) PCT Filed: Jun. 28, 2021

(86) PCT No.: PCT/KR2021/008119
§ 371 (c)(1),
(2) Date: Feb. 23, 2023

(87) PCT Pub. No.: WO2022/050542
PCT Pub. Date: Mar. 10, 2022

(65) Prior Publication Data
US 2023/0330602 A1    Oct. 19, 2023

(30) Foreign Application Priority Data

Sep. 7, 2020  (KR) .................. 10-2020-0113991

(51) Int. Cl.
*B01D 53/22*    (2006.01)
*B01D 67/00*    (2006.01)
(Continued)

(52) U.S. Cl.
CPC ....... *B01D 67/0002* (2013.01); *B01D 53/228* (2013.01); *B01D 69/106* (2022.08);
(Continued)

(58) Field of Classification Search
CPC  B01D 67/0002; B01D 69/106; B01D 69/107; B01D 53/228; B01D 69/12; B01D 71/56; B01D 2323/082; C02F 1/44
See application file for complete search history.

(56) References Cited

U.S. PATENT DOCUMENTS 2,615,002 A * 10/1952 Hurwitz ................ C08K 5/053
524/386
3,296,048 A *  1/1967 Wolfe .................... B29C 73/06
411/908
(Continued)

FOREIGN PATENT DOCUMENTS

JP           3053429 B   6/2006
KR   10-2010-0079530 A   7/2010
(Continued)

*Primary Examiner* — Anthony R Shumate
(74) *Attorney, Agent, or Firm* — NKL Law; Jae Youn Kim

(57) ABSTRACT

The present disclosure relates to an ultra-thin polymer separation membrane including: a porous polymer support layer; a gutter layer formed on the porous polymer support layer; and a semi-crystalline polymer selection layer formed on the gutter layer, wherein the semi-crystalline polymer selection layer is coated with a nanometer-level thickness in a state in which the temperature of a semi-crystalline polymer solution is 0° C. to −50° C. Therefore, the crystallinity and orientation of the ultra-thin polymer separation membrane, essentially required for the scale-up of a separation membrane process and the actual application in the industry, can be controlled easily using a low-temperature coating method, in which the temperature of the polymer solution is lowered, during the coating of the selection layer. Further-
(Continued)

more, separation performance can be enhanced remarkably by using only polymers as raw materials, without additional additives that have been used in the manufacturing of conventional ultra-thin polymer separation membranes.

15 Claims, 14 Drawing Sheets

(51) Int. Cl.
   *B01D 69/10*   (2006.01)
   *B01D 69/12*   (2006.01)
   *B01D 71/56*   (2006.01)
   *C02F 1/44*    (2023.01)

(52) U.S. Cl.
   CPC .......... *B01D 69/107* (2022.08); *B01D 69/12* (2013.01); *B01D 71/56* (2013.01); *C02F 1/44* (2013.01); *B01D 2323/082* (2022.08)

(56) References Cited

U.S. PATENT DOCUMENTS

| | | | | |
|---|---|---|---|---|
| 3,311,153 A * | 3/1967 | Wolfe | ............... | B60C 5/004 152/429 |
| 3,904,120 A * | 9/1975 | Sbicca | ............... | B05B 15/16 239/288.5 |
| 4,260,699 A * | 4/1981 | Plaisted | ............... | C08F 299/045 156/332 |
| 5,464,890 A * | 11/1995 | Diaz-Kotti | ............... | D01F 6/92 524/539 |
| 8,893,524 B1 * | 11/2014 | Archer | ............... | F25D 3/14 62/457.2 |
| 2008/0095960 A1 * | 4/2008 | Schell | ............... | B32B 27/36 428/34.8 |
| 2010/0129579 A1 * | 5/2010 | Ashbaugh | ............... | C08F 10/02 428/36.9 |
| 2018/0298225 A1 * | 10/2018 | Yan | ............... | C09D 175/04 |
| 2021/0395991 A1 * | 12/2021 | Catanese | ............... | E03D 13/005 |
| 2022/0275576 A1 * | 9/2022 | Liu | ............... | D06L 1/14 |
| 2024/0336719 A1 * | 10/2024 | Liu | ............... | C08G 18/3203 |

FOREIGN PATENT DOCUMENTS

| | | |
|---|---|---|
| KR | 10-2015-0001369 A | 1/2015 |
| KR | 10-1837703 B1 | 3/2018 |
| KR | 10-1968140 A | 12/2018 |

* cited by examiner

METHOD FOR MANUFACTURING ULTRA-THIN POLYMER SEPARATION MEMBRANE BY USING LOW-TEMPERATURE COATING

TECHNICAL FIELD

The present disclosure relates to a method for manufacturing an ultra-thin polymer separation membrane using a low-temperature coating method, more particularly to a method for manufacturing an ultra-thin polymer separation membrane having enhanced separation performance and advantageous in terms of area enlargement and actual application to the industry by controlling the crystallinity and orientation of a semi-crystalline polymer.

BACKGROUND ART

Polymer separation membranes are highly esteemed as core components in various scientific and technological fields such as electronic materials, drug manufacturing, food packaging, protective equipment, fuel cells, water purification, gas and vapor separation, etc. The separation membranes are applicable to such fields because they can control the penetration rate of materials passing therethrough using concentration, pressure, potential difference, etc. as driving force. Separation processes using pressure difference as driving force include microfiltration (MF), ultrafiltration (UF), reverse osmosis (RO), pervaporation (PV), gas separation (GS), etc.

The market size and applications of gas separation using membranes are expanding day by day, because energy consumption and operation cost can be saved. For example, in petrochemical processes, the separation of propylene and ethylene is achieved through a distillation process, which is economically ineffective because of very high energy consumption. In particular, separation membranes using polymer films are advantageous in that specific gases can be separated selectively from gas mixtures based on the difference in the penetration rate of gas molecules. Polymer separation membranes for gas separation are being studied a lot since the permeation characteristics of polymers were reported by Mitchell (1830 and 1833), Graham (1866), etc. Mitchell observed that natural rubber balloons filled with hydrogen gas deflated over time and proposed that this phenomenon is due to the release or diffusion of the gas through the balloon wall. Graham repeated Mitchell's experiments using natural rubber films and reported the first quantitative measurements of the gas penetration rate through the natural rubber films.

Despite this long history, the polymer separation membrane has been actually applied to the gas separation industry for only about 40 years. The dense polymer separation membranes that could be prepared before the 1970s were too thick to achieve the high penetration volume necessary for application to actual processes. The development of the Loeb-Sourirajan process was a milestone in the history of separation membranes that allow the manufacturing of defect-free, high-flow-volume, ultra-thin, asymmetric reverse osmosis separation membranes. Since then, many polymer separation membranes and modules based on asymmetric separation membranes were developed and they were applied to treatment systems in the field of microfiltration, ultrafiltration and reverse osmosis.

In the 1980s, the first commercial-scale gas separation membrane system using a polymer separation membrane called Prism was introduced. It began to be used in recovery of hydrogen from purge gas in ammonia synthesis plants. In the previous process, ammonia was produced from the catalytic reaction of hydrogen and nitrogen at high temperature and pressure. Hydrogen is supplied through steam reforming of natural gas. Because the conversion rate to ammonia is limited at 18-20%, unreacted gas should be recovered and recycled to the raw materials in order to improve yield. Purging is performed to prevent the mixing of the inert gas and unreacted methane. Although the purge gas contains hydrogen, it is costly to recover hydrogen through the conventional separation process. The gas separation membrane is best applicable when the feed gas is at high pressure and the penetrating part can be maintained at low pressure.

At present, the gas separation processes using polymer separation membranes are consistently competing with other separation processes such as adsorption, absorption and cryogenic methods. The gas separation membrane process has competitive edge over other technologies due to easy operation, small scale, low energy consumption, mobility, reliability, space efficiency, etc. Currently, the gas separation membrane process is used in separation and recovery of hydrogen from synthesis gas in petrochemical processes as well as in EOR (enhanced oil recovery), natural gas purification, landfill gas recovery, air separation, dehydration, deaeration, helium recovery, etc.

As described above, the separation membrane process has been researched a lot in the past several decades as a process for replacing the conventional separation process such as distillation, absorption, adsorption, etc. because of the advantages of low energy consumption due to the absence of phase change, small space for installation and simple scale-up. However, the existing polymer-based separation membranes have been intensively studied in the level of thick (bulk) films with thicknesses of tens of micrometers. Therefore, for the scale-up and actual application of the separation membrane process, the manufacturing of a thin-film composite (TFC) membrane with a large flow volume is essential.

Because the previous researches on polymer separation membranes have concentrated on the development of materials in the level of thick films, researches for comprehensive understanding of the change in phase separation behavior and crystal structure, caused by the nanoscale confinement phenomenon occurring when a polymer material is coated with a thin film, and solving the problems have not been conducted.

Conventionally, ultra-thin separation membranes have been prepared by coating a thin polymer film on a specific support layer at room temperature by dip coating, spin coating, spray coating, bar coating, etc. However, because of the thin-film formation condition different from that of the thick-film membranes, such as low viscosity, fast solvent evaporation, etc., and the nanoscale confinement phenomenon, there occur change in the phase separation behavior and crystal structure of the polymer. As a result, even when the ultra-thin separation membrane is coated without defects, its separation performance becomes remarkably lower than that of the existing thick-film separation membranes.

Accordingly, a method for manufacturing an ultra-thin polymer separation membrane, which can significantly improve separation performance by lowering the crystallinity of a polymer while forming a thin polymer film with a nanometer-level thickness, is necessary.

DISCLOSURE

Technical Problem

The present disclosure is directed to providing a method for manufacturing an ultra-thin polymer separation membrane, which allows easy control of the crystallinity and orientation of the ultra-thin polymer separation membrane, essentially required for the scale-up of a separation membrane process and the actual application in the industry, using a low-temperature coating method, in which the temperature of the polymer solution is lowered, during the coating of a selection layer, and can remarkably enhance separation performance by using only polymers as raw materials, without additional additives that have been used in the manufacturing of conventional ultra-thin polymer separation membranes.

Technical Solution

In an aspect, the present disclosure provides an ultra-thin polymer separation membrane including:
a porous polymer support layer;
a gutter layer formed on the porous polymer support layer; and
a semi-crystalline polymer selection layer formed on the gutter layer,
wherein the semi-crystalline polymer selection layer is coated with a nanometer-level thickness in a state in which the temperature of a semi-crystalline polymer solution is 0° C. to −50° C.

The ultra-thin polymer separation membrane may be separation membrane for any one selected from carbon dioxide capture, natural gas purification, petrochemical distillation processes, petrochemical purification processes, water treatment and reverse osmosis seawater desalination.

The ultra-thin polymer separation membrane may be used for any one selected from an electronic device, an electrode, a packaging and a sensor.

In another aspect,
the present disclosure provides a method for manufacturing an ultra-thin polymer separation membrane, which includes a step of coating a semi-crystalline polymer selection layer formed with a nanometer-level thickness by controlling the temperature of a semi-crystalline polymer solution to 0° C. to −50° C.

The temperature of the semi-crystalline polymer solution may be controlled to −5° C. to −45° C.

The crystallinity and orientation of a semi-crystalline polymer is controlled by controlling the temperature of the semi-crystalline polymer solution within the range.

The concentration of the semi-crystalline polymer solution may be controlled to 0.5-5 wt %.

The thickness of the semi-crystalline polymer selection layer may be controlled by controlling the concentration of the semi-crystalline polymer solution.

The selection layer formed with a nanometer-level thickness may have a thickness of 20-1000 nm.

The method for manufacturing an ultra-thin polymer separation membrane may include:
a step of preparing a porous support with a gutter layer formed by coating a gutter layer on a porous polymer support; and
a step of forming a semi-crystalline polymer selection layer by coating the semi-crystalline polymer solution on the gutter layer.

The coating may be performed by any method selected from spin coating, roll coating, dip coating, bar coating, flow coating and spray coating.

The semi-crystalline polymer may be based on any one selected from a polyamide, a polystyrene, a polyolefin, a polyester and a polyurethane.

The semi-crystalline polymer may be a polyamide-based semi-crystalline polymer.

The polyamide-based semi-crystalline polymer may include any one selected from polyamide 6, polyamide 66, polyamide 610, polyamide 612, polyamide 11 and polyamide 12 as a hard segment.

The polyamide-based semi-crystalline polymer may include any one selected from polyethylene glycol, polypropylene glycol, polytetramethylene glycol and polycaprolactone polyol as a soft segment.

The polyamide-based semi-crystalline polymer may be any one selected from PEBAX, UBE-PAE, Grilamid, Diamide-PAE, Novamid-PAE and Vestamid.

In another aspect,
the present disclosure provides a gas separation system including the ultra-thin polymer separation membrane described above.

In another aspect,
the present disclosure provides a water treatment system including the ultra-thin polymer separation membrane described above.

Advantageous Effects

A method for manufacturing an ultra-thin polymer separation membrane of the present disclosure can easily control the crystallinity and orientation of an ultra-thin polymer separation membrane, essentially required for the scale-up of a separation membrane process and the actual application in the industry, using a low-temperature coating method, in which the temperature of the polymer solution is lowered, during the coating of a selection layer, and can remarkably enhance separation performance by using only polymers as raw materials, without additional additives that have been used in the manufacturing of conventional ultra-thin polymer separation membranes.

An ultra-thin polymer separation membrane manufactured according to the method for manufacturing an ultra-thin polymer separation membrane of the present disclosure may be applied to various separation processes such as carbon dioxide capture before and after combustion (carbon dioxide/nitrogen), natural gas purification (carbon dioxide/methane), petrochemical processes (olefin/paraffin), petrochemical purification technologies, reverse osmosis seawater desalination technologies, etc. to remarkably enhance separation performance and can reduce energy used in the separation processes.

BEST MODE

Hereinafter, various aspects and exemplary embodiments of the present disclosure are described more specifically.

The exemplary embodiments of the present disclosure will be described in detail referring to the attached drawings so that those having ordinary knowledge in the art to which the present disclosure belongs can easily carry out the present disclosure.

However, the following description is not intended to limit the present disclosure to specific exemplary embodiments. When describing the present disclosure, a detailed description of known technology may be omitted to avoid unnecessarily obscuring the subject matter of the present disclosure.

The terms used herein are for the purpose of describing specific exemplary embodiments only, and are not intended to limit the present disclosure. Singular expressions include plural expressions unless the context clearly indicates otherwise. In the present disclosure, it is to be understood that terms such as "include", "have", etc. are intended to indicate that there is a feature, number, step, operation, component or combination thereof described in the specification, and not to exclude the presence or possibility of addition of one or more other features, numbers, steps, operations, components or combinations thereof.

Figure 1:
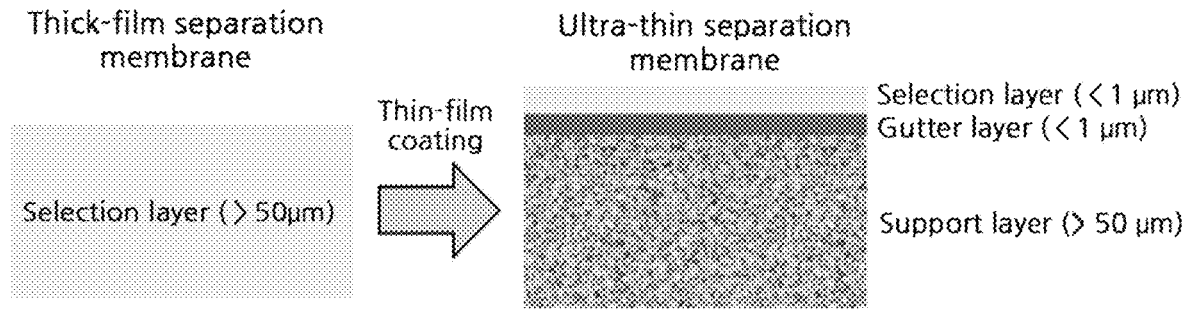
FIG. 1 schematically shows a conventional thick-film polymer separation membrane and an ultra-thin polymer separation membrane manufactured by a method for manufacturing an ultra-thin polymer separation membrane according to the present disclosure using a low-temperature coating method.
Figure 2:
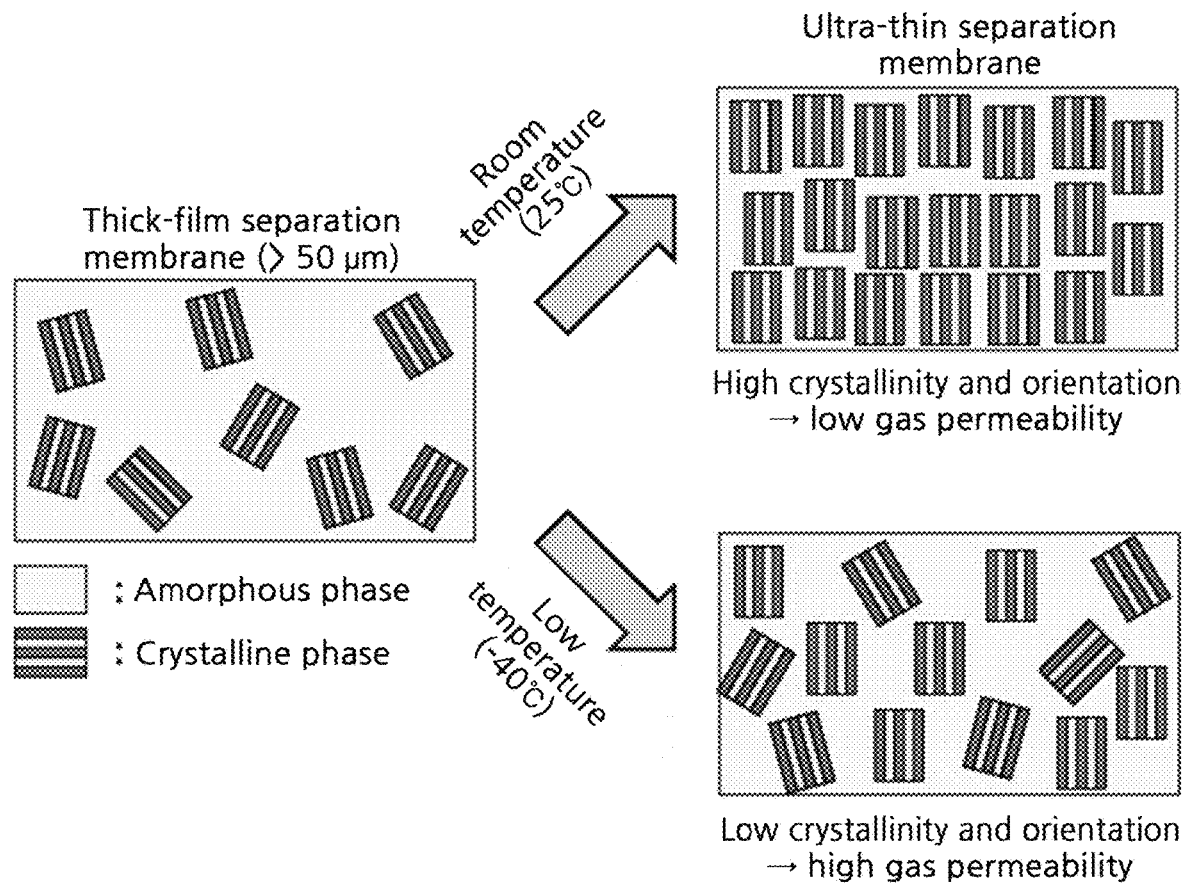
FIG. 2 schematically shows a conventional thick-film polymer separation membrane and the difference in crystallinity and orientation of an ultra-thin polymer separation membrane depending on coating temperature.
Figure 3A:
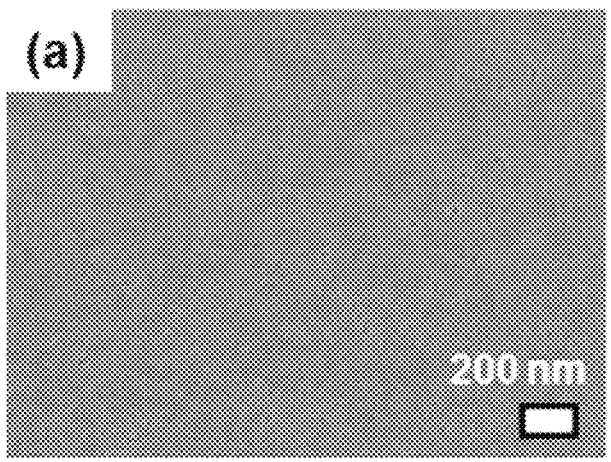
FIGS. 3A to 3D show SEM and TEM images obtained in Test Example 1.
Figure 3B:
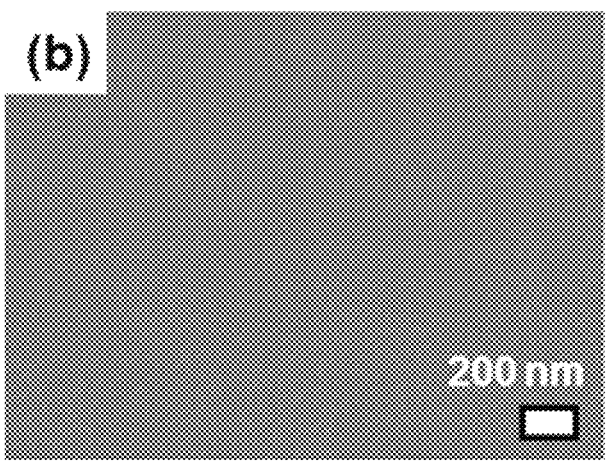
Figure 3C:
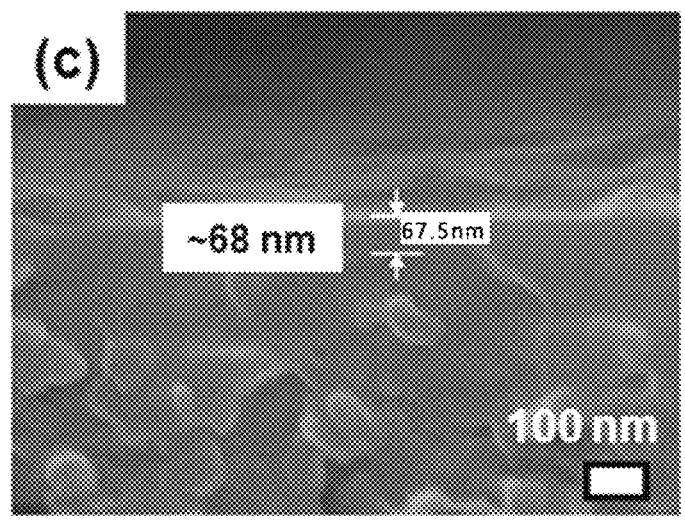
Figure 3D:
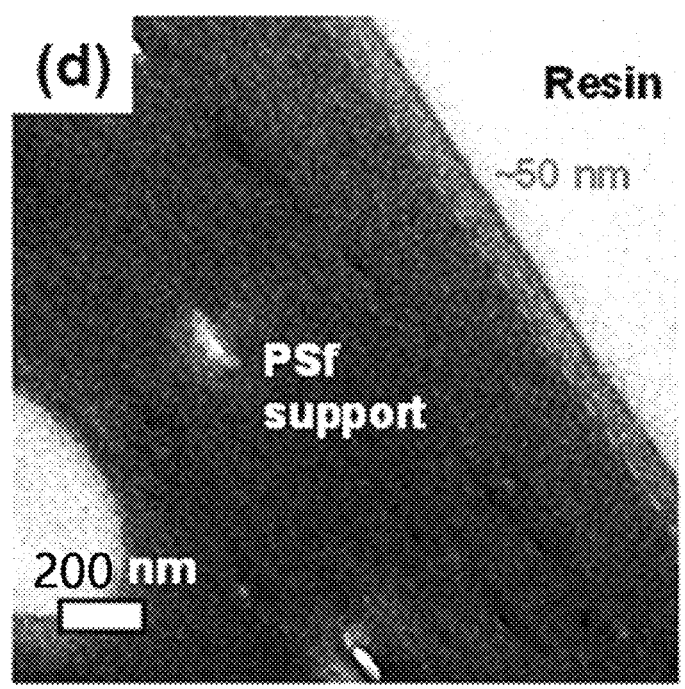
Figure 4A:
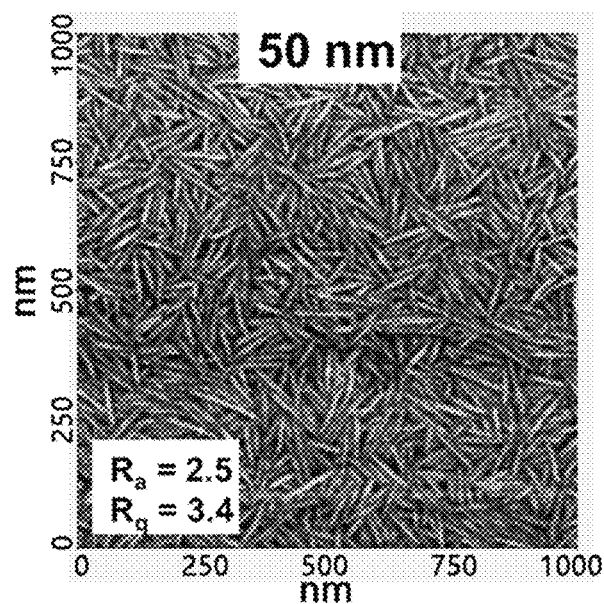
FIGS. 4A to 4E show the AFM images of ultra-thin separation membranes obtained in Test Example 2.
Figure 4B:
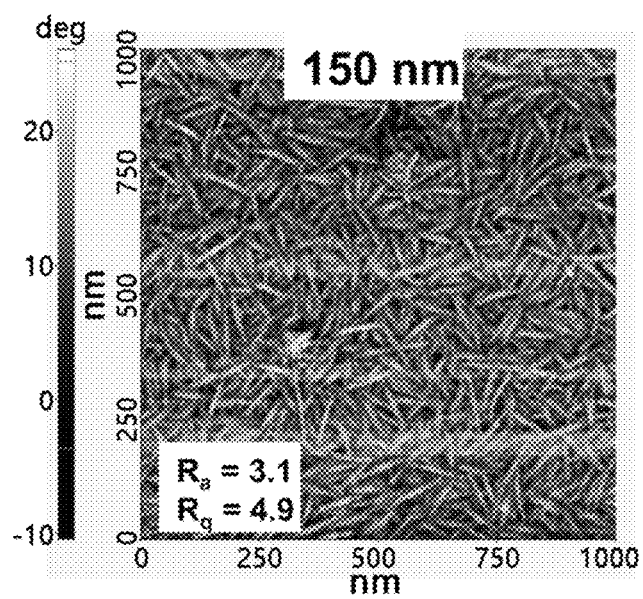
Figure 4C:
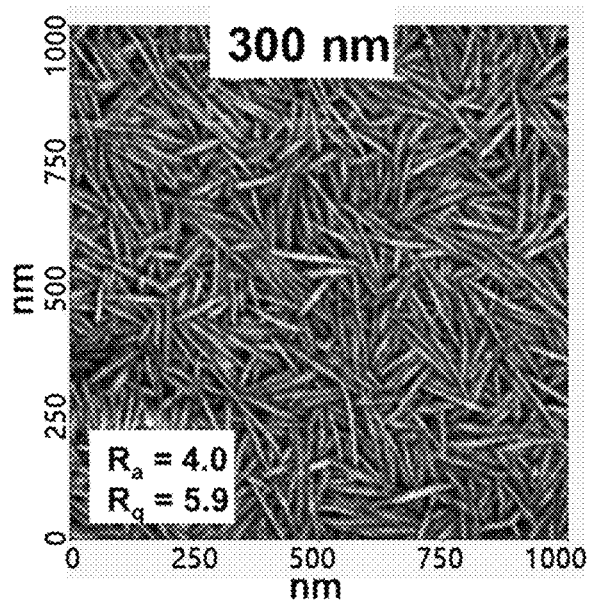
Figure 4D:
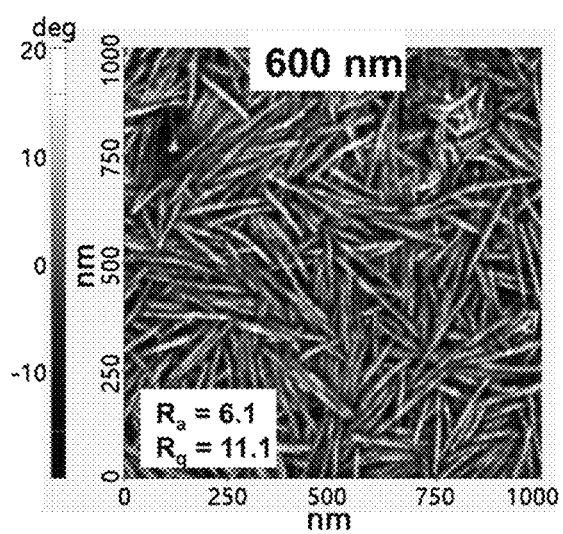
Figure 4E:
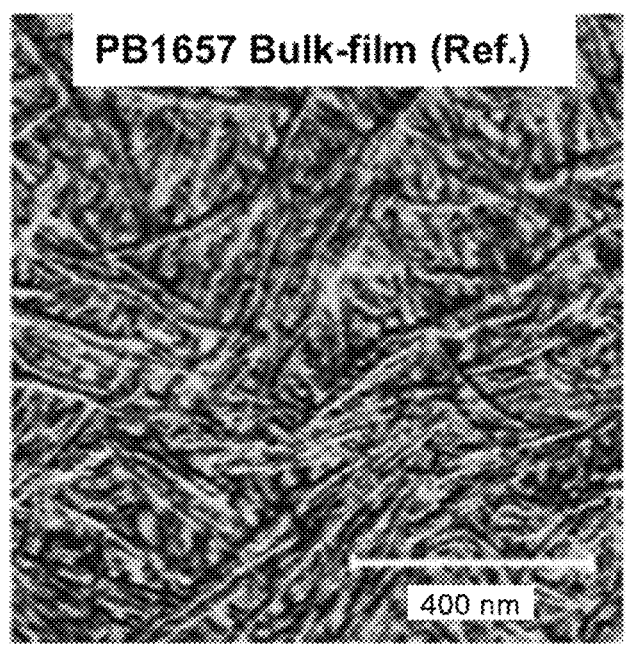
Figure 5A:
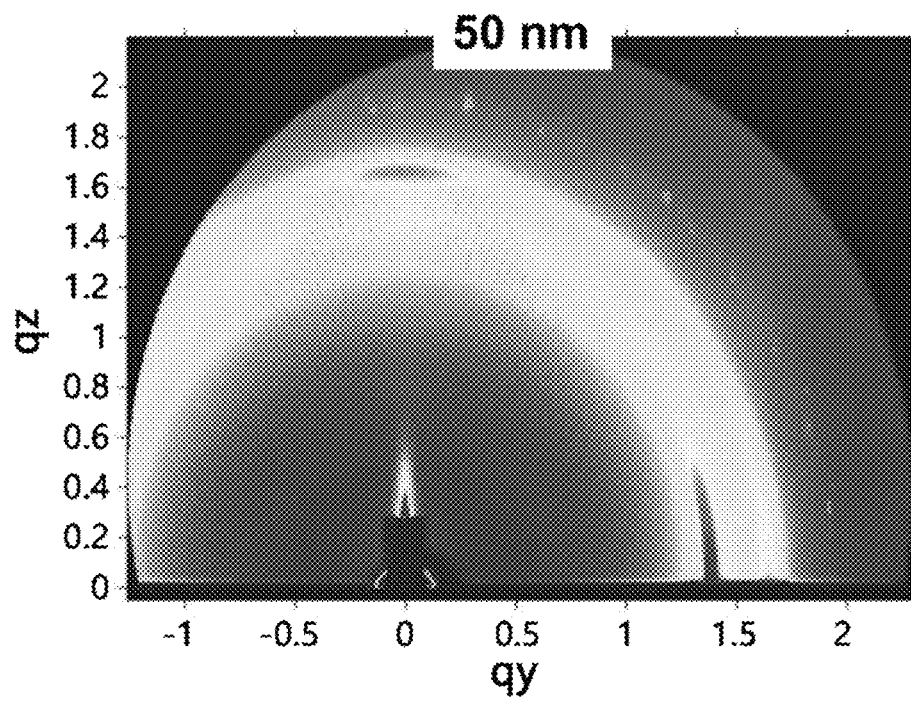
FIGS. 5A to 5D show the GIWAXS analysis results in Test Example 2.
Figure 5B:
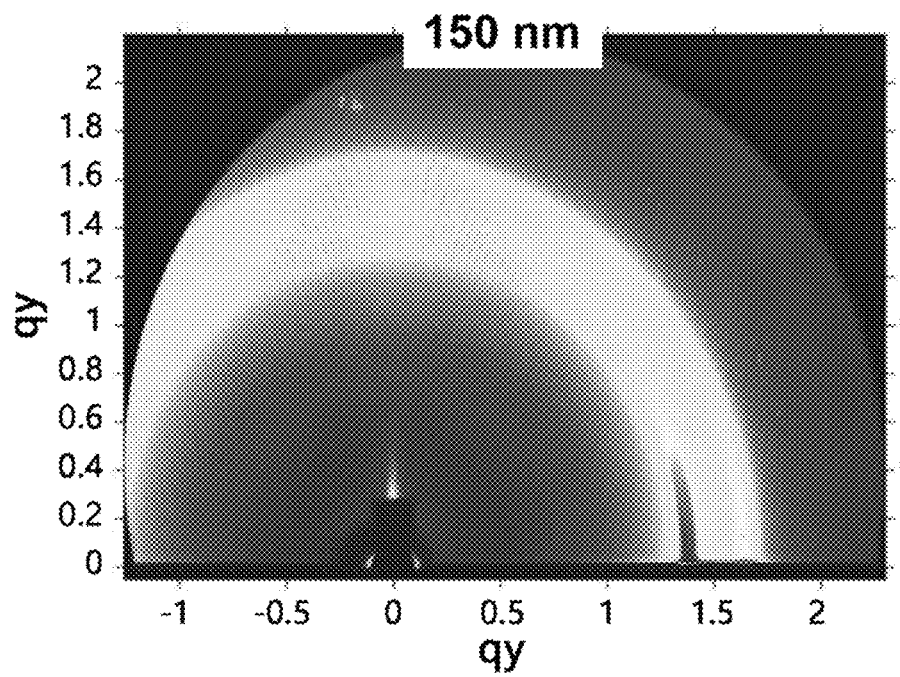
Figure 5C:
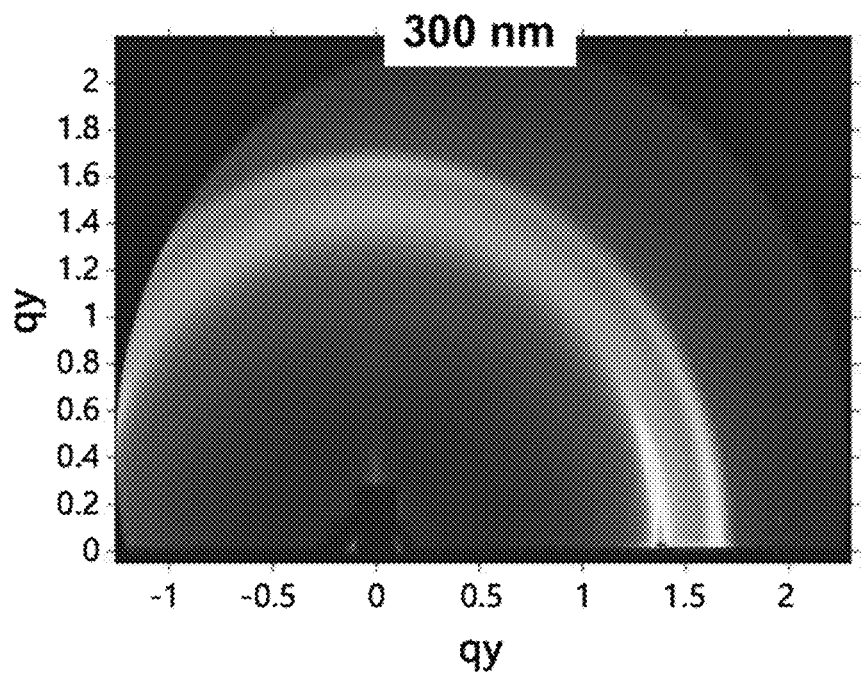
Figure 5D:
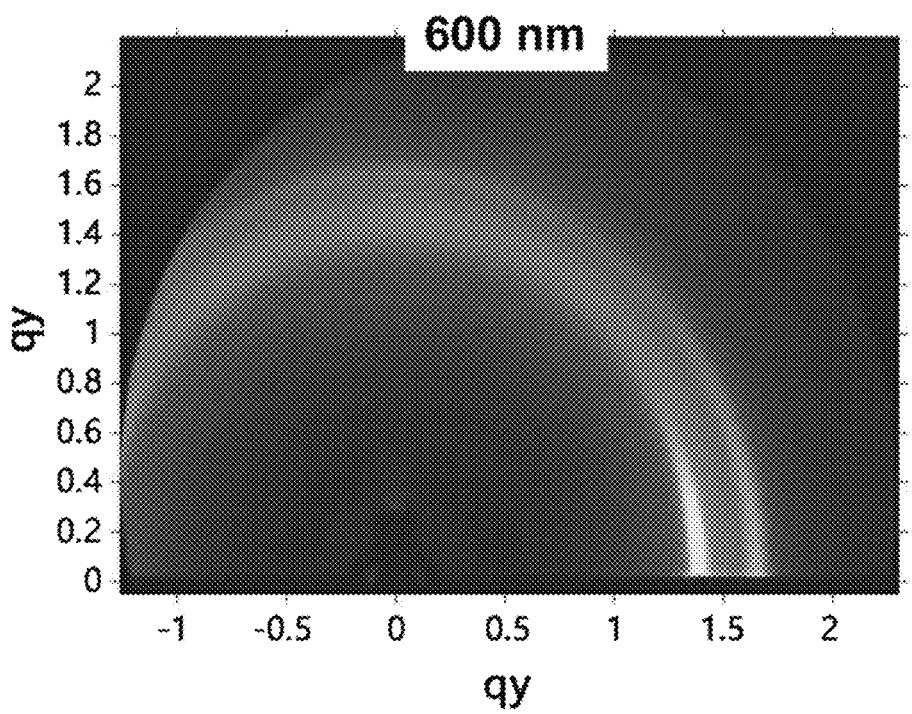

FIG. 1 schematically shows a conventional thick-film polymer separation membrane and an ultra-thin polymer separation membrane manufactured according to a method for manufacturing an ultra-thin polymer separation membrane of the present disclosure using a low-temperature coating method, and FIG. 2 schematically shows a conventional thick-film polymer separation membrane and the difference of crystallinity and orientation of an ultra-thin polymer separation membrane depending on coating temperature.

Hereinafter, a method for manufacturing an ultra-thin polymer separation membrane using a low-temperature coating method will be described referring to FIG. 1 and FIG. 2.

The method for manufacturing an ultra-thin polymer separation membrane includes a step of coating a semi-crystalline polymer selection layer formed with a nanometer-level thickness by controlling the temperature of a semi-crystalline polymer solution to 0° C. to −50° C.

Specifically, the temperature of the semi-crystalline polymer solution may be controlled to −5° C. to −45° C., more specifically to −10° C. to −40° C. If the temperature of the semi-crystalline polymer solution is above 0° C., separation performance may worsen due to decreased gas permeability as the crystallinity and orientation of the polymer are increased. And, if it is below −50° C., precipitation may occur in the polymer solution.

The crystallinity and orientation of a semi-crystalline polymer may be controlled by controlling the temperature of the semi-crystalline polymer solution within the above ranges.

The concentration of the semi-crystalline polymer solution may be controlled specifically to 0.5-5 wt %, more specifically to 0.5-3 wt %, further more specifically to 0.5-2 wt %. If the concentration of the semi-crystalline polymer solution is below 0.5 wt %, a thin film may not be formed completely because the concentration is too low. And, if it exceeds 5 wt %, a thin film with a desired thickness may not be formed because the thickness is increased.

The desired thickness of the semi-crystalline polymer selection layer may be controlled by controlling the concentration of the semi-crystalline polymer solution.

The selection layer formed with the nanometer-level thickness may have a thickness of specifically 20-1000 nm, more specifically 30-800 nm, further more specifically 40-600 nm. If the thickness is smaller than 20 nm, the durability of the selection layer may worsen or the nanoscale confinement phenomenon of the polymer may worsen. And, if it exceeds 1000 nm, the conditions required for the thin film may not be satisfied.

Specifically, the method for manufacturing an ultra-thin polymer separation membrane of the present disclosure may include: a step of preparing a porous support with a gutter layer formed by coating a gutter layer on a porous polymer support; and a step of forming a semi-crystalline polymer selection layer on the gutter layer by coating the semi-crystalline polymer solution.

The coating may be performed by spin coating, roll coating, dip coating, bar coating, flow coating, spray coating, etc.

The semi-crystalline polymer refers to a polymer in which a crystalline region and an amorphous region exist at the same time.

Specifically, the semi-crystalline polymer may be based on any one selected from a polyamide, a polystyrene, a polyolefin, a polyester and a polyurethane. More specifically it may be a polyamide-based semi-crystalline polymer.

The polyamide-based semi-crystalline polymer may include any one selected from polyamide 6, polyamide 66, polyamide 610, polyamide 612, polyamide 11 and polyamide 12 as a hard segment.

In addition, the polyamide-based semi-crystalline polymer may include any one selected from polyethylene glycol, polypropylene glycol, polytetramethylene glycol and polycaprolactone polyol as a soft segment.

As the polyamide-based semi-crystalline polymer, any one selected from PEBAX, UBE-PAE, Grilamid, Diamide-PAE, Novamid-PAE and Vestamid may be specifically used. More specifically, PEBAX may be used.

The porous polymer support serves to provide mechanical strength to the ultra-thin polymer separation membrane.

Specifically, the porous polymer support may be prepared from a material including any one selected from polysulfone (PSF), polyether sulfone (PES), polyacrylonitrile (PAN), polyvinylidene fluoride (PVDF), polyimide, polyether imide (PEI), polyamide (PA), cellulose acetate and cellulose triacetate. More specifically, it may be prepared from polysulfone (PSF). It is because they are widely used as support layer materials for commercial polymer separation membranes and allow easy control of porosity and have superior thermal, chemical and mechanical stability.

The porous polymer support may have a thickness of 30-50 μm. If the thickness is smaller than 30 μm, structural breakage may occur due to weak mechanical strength. And, if it exceeds 50 μm, the porous polymer support may not be actually applicable to various industries because of increased permeation resistance of the support layer.

The gutter layer is disposed between the porous polymer support and the selection layer. It serves to prevent the penetration of the selection layer into pores and increase the gas permeability of the selection layer.

The gutter layer may include any one selected from polydimethylsiloxane (PDMS), poly [1-(trimethylsilyl)-1-propyne (PTMSP) and a perfluoropolymer.

Specifically, the gutter layer may have a thickness of 30-1000 nm. If the thickness is smaller than 30 nm, the penetration of the selection layer into pores cannot be prevented or the gas permeability may not be increased as desired. And, if it exceeds 1000 nm, it is not consistent with the intent of the ultra-thin separation membrane and the permeation resistance of the gutter layer may be increased.

The present disclosure also provides an ultra-thin polymer separation membrane manufactured by the method for manufacturing an ultra-thin polymer separation membrane described above.

The ultra-thin polymer separation membrane of the present disclosure includes: a porous polymer support layer; a gutter layer formed on the porous polymer support layer; and a semi-crystalline polymer selection layer formed on the gutter layer, wherein the semi-crystalline polymer selection layer is coated with a nanometer-level thickness in a state in which the temperature of a semi-crystalline polymer solution is 0° C. to −50° C.

The ultra-thin polymer separation membrane of the present disclosure may be a separation membrane for any one selected from carbon dioxide capture, natural gas purification, petrochemical distillation processes, petrochemical purification processes, water treatment and reverse osmosis seawater desalination, although the scope of the present disclosure is not limited thereto.

In addition, the ultra-thin polymer separation membrane of the present disclosure may be used for any one selected from an electronic device, an electrode, a packaging and a sensor, although the scope of the present disclosure is not limited thereto.

The present disclosure also provides a gas separation system including the ultra-thin polymer separation membrane described above.

The present disclosure also provides a water treatment system including the ultra-thin polymer separation membrane described above.

Mode for Invention

Hereinafter, the present disclosure is described more specifically through examples.

EXAMPLES

Example 1: Preparation of PEBAX-Based Ultra-Thin Separation Membrane

Polysulfone (PSF) was selected for a porous support layer that can provide mechanical strength. Polydimethylsiloxane (PDMS) was selected for a gutter layer that can prevent penetration of the support layer into pores and provide high permeability. And, the polyethylene oxide (PEO)-polyamide (PA) block copolymer PEBAX (PEBAX 1657, PEO:PA=6:4, Arkema), which is being researched as a polymer separation membrane material for carbon dioxide capture, was selected for a selection layer.

First, after preparing a 3 wt % PDMS solution in hexane to coat PDMS on the surface of the polysulfone (PSF) support layer, a PDMS-coated PSF support layer was prepared by bar-coating the same at 60 mm/s.

Then, after adding a PEBAX 1657 pellet represented by Chemical Formula 1 in a solvent (ethanol:water=7:3, mass ratio) and then preparing a PEBAX solution by stirring at 80° C. for 6 hours, the prepared PEBAX solution was cooled to −40° C. and then a PEBAX-based ultra-thin separation membrane was prepared by forming a PEBAX selection layer on the PDMS-coated PSF support layer through spin coating at 2,000 rpm.

The thickness of the PEBAX selection layer was controlled with the concentration of the PEBAX solution used during the coating. In Example 1, the PEBAX selection layer was formed with a thickness of about 50 nm by controlling the concentration of the PEBAX solution to 0.5 wt %.

[Chemical Formula 1]

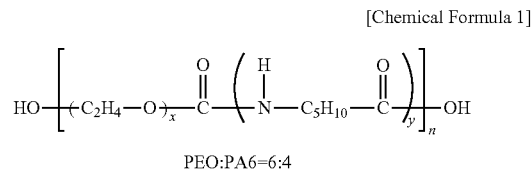

PEO:PA6=6:4

Example 2: Preparation of PEBAX-Based Ultra-Thin Separation Membrane

A PEBAX-based ultra-thin separation membrane was prepared under the same condition as in Example 1 except that a PEBAX selection layer with a thickness of about 150 nm was formed by controlling the concentration of the PEBAX solution to 1 wt % instead of 0.5 wt %.

Example 3: Preparation of PEBAX-Based Ultra-Thin Separation Membrane

A PEBAX-based ultra-thin separation membrane was prepared under the same condition as in Example 1 except that a PEBAX selection layer with a thickness of about 300 nm was formed by controlling the concentration of the PEBAX solution to 2 wt % instead of 0.5 wt %.

Example 4: Preparation of PEBAX-Based Ultra-Thin Separation Membrane

A PEBAX-based ultra-thin separation membrane was prepared under the same condition as in Example 1 except that a PEBAX selection layer with a thickness of about 600 nm was formed by controlling the concentration of the PEBAX solution to 3 wt % instead of 0.5 wt %.

Example 5: Preparation of PEBAX-Based Ultra-Thin Separation Membrane

A PEBAX-based ultra-thin separation membrane was prepared under the same condition as in Example 1 except that the selection layer was coated by controlling the temperature of the PEBAX solution to −10° C. instead of −40° C.

Comparative Example 1: Preparation of PEBAX-Based Ultra-Thin Separation Membrane A PEBAX-based thick-film membrane was prepared under the same condition as in Example 1 except that the selection layer was coated by controlling the temperature of the PEBAX solution to 25° C. instead of −40° C.

Comparative Example 2: Preparation of PEBAX-Based Ultra-Thin Separation Membrane A PEBAX-based thick-film membrane was prepared under the same condition as in Example 2 except that the selection layer was coated by controlling the temperature of the PEBAX solution to 25° C. instead of −40° C.

Comparative Example 3: Preparation of PEBAX-Based Ultra-Thin Separation Membrane A PEBAX-based thick-film membrane was prepared under the same condition as in Example 3 except that the selection layer was coated by controlling the temperature of the PEBAX solution to 25° C. instead of −40° C.

Comparative Example 4: Preparation of PEBAX-Based Ultra-Thin Separation Membrane A PEBAX-based thick-film membrane was prepared under the same condition as in Example 4 except that the selection layer was coated by controlling the temperature of the PEBAX solution to 25° C. instead of −40° C.

TEST EXAMPLES

Test Example 1: Analysis of SEM and TEM Images

The SEM image of the surface of the porous PSF support (a), the SEM image of the surface of the of the PSF support coated with the PDMS gutter layer (b), the SEM image of the cross section of the ultra-thin separation membrane coated with the PEBAX selection layer (c) and the TEM image of the cross section of the ultra-thin separation membrane coated with the PEBAX selection layer (d) obtained during the preparation of the PEBAX-based ultra-thin separation membrane in Example 1 are shown in FIGS. 3A to 3D.

Test Example 2: Analysis of Crystal Structure of PEBAX-Based Ultra-Thin Separation Membranes Coated at High Temperature In order to analyze crystal structure depending on the thickness of the PEBAX selection layer under the condition of coating at room temperature (25° C.), the AFM images of the ultra-thin separation membrane of Comparative Example 1 (a), the ultra-thin separation membrane of Comparative Example 2 (b), the ultra-thin separation membrane of Comparative Example 3 (c), the ultra-thin separation membrane of Comparative Example 4 (d) and the conventional thick-film separation membrane film (e) were compared in FIGS. 4A to 4E. It was confirmed from the AFM image analysis that the crystal structure of the PEBAX-based ultra-thin separation membranes prepared in Comparative Examples 1-4 became denser as the thickness of the PEBAX selection layer was smaller. That is to say, it can be seen that, when the selection layer is coated at high temperature, the crystal structure becomes denser as the thickness of the selection layer is decreased. As a result, the resulting separation membrane has inappropriate properties because gas permeability is decreased.

Figure 6A:
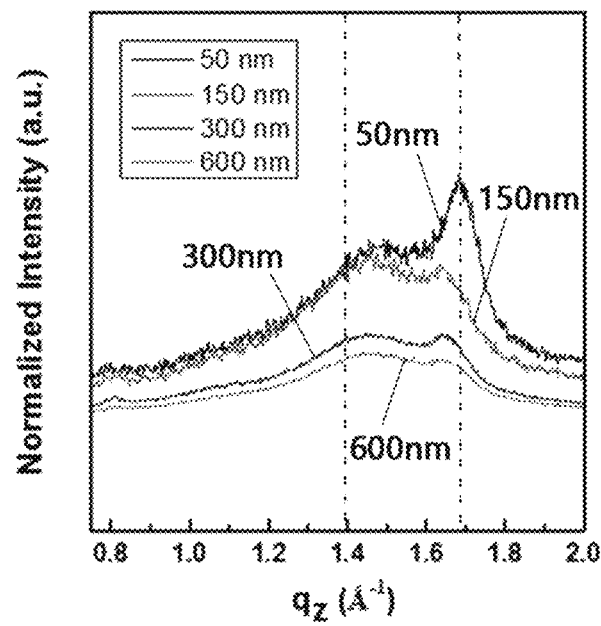
FIGS. 6A and 6B show the XRD spectrum analysis result in Test Example 2.
Figure 6B:
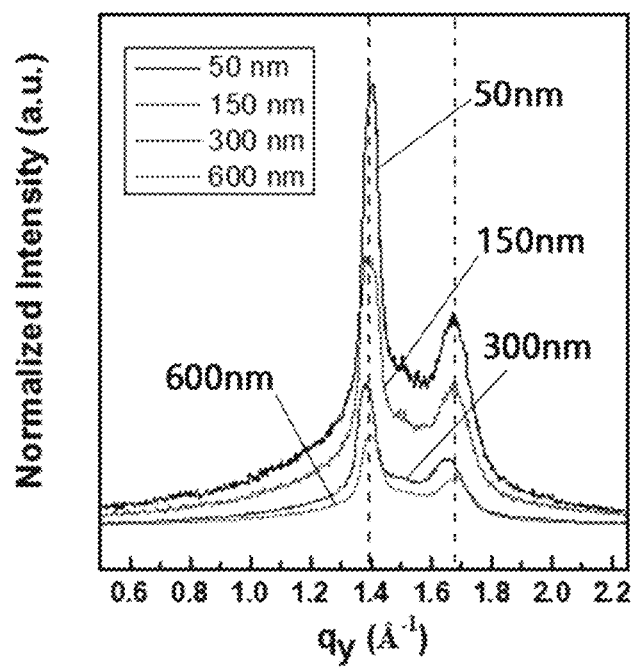
Figure 7:
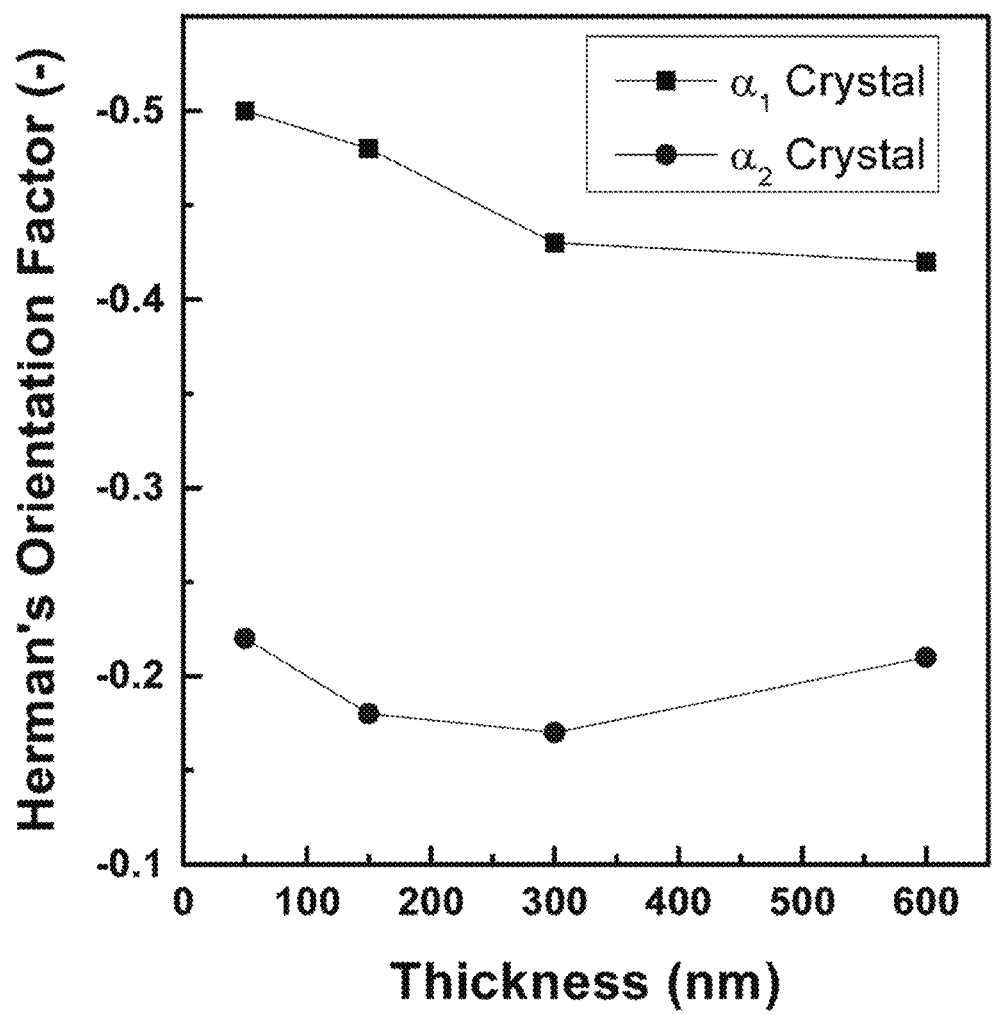
FIG. 7 shows a result of analyzing Herman's orientation factors in Test Example 2.

Meanwhile, as another method of analyzing the crystal structure depending on the thickness of the PEBAX selection layer under the condition of coating at room temperature (25° C.), the thin-film structure of the PEBAX-based ultra-thin separation membranes prepared in Comparative Examples 1-4 by coating at high temperature by the GIWAXS (grazing-incidence wide-angle X-ray scattering) method is shown in FIGS. 5A to 5D. The 2D GIWAXS pattern images of Comparative Example 1 (a), Comparative Example 2 (b), Comparative Example 3 (c) and the ultra-thin separation membrane of Comparative Example 4 (d) are shown. In addition, the surface (out-of-plane) XRD spectra (a) and cross-sectional (in-plane) XRD spectra (b) obtained from XRD spectrum analysis are shown in FIGS. 6A and 6B, and the result of analyzing the Herman's orientation factor is shown in FIG. 7.

It was confirmed that crystallinity is increased as the thickness of the PEBAX selection layer is decreased under the condition of coating at room temperature (25° C.). Higher crystallinity is inappropriate for a separation membrane because gas permeability is decreased.

Test Example 3: Analysis of Crystal Structure of PEBAX-Based Ultra-Thin Separation Membranes Using Low-Temperature Coating Method Because a crystalline phase acts as an impermeable barrier in a polymer separation membrane, the increase in crystallinity caused by the nanoscale confinement phenomenon which is aggravated as the thickness of the polymer thin film is decreased may lower the separation performance of the ultra-thin separation membrane. In order to decrease the high crystallinity of the polymer thin film to solve this problem, it was tested whether the crystallinity of the separation membrane selection layer can be actually decreased by introducing a low-temperature coating method which allows thermodynamic suppression of crystal growth.

Figure 8A:
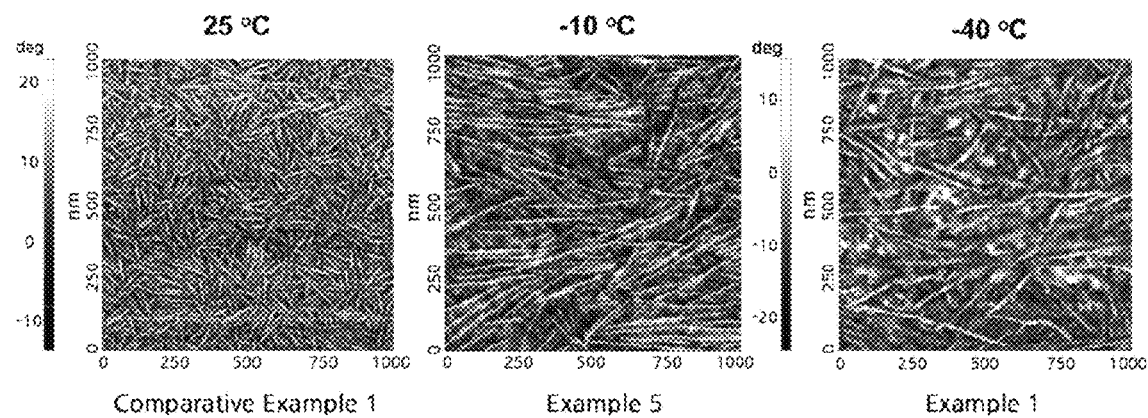
FIG. 8A shows AFM images and FIG. 8B shows 2D GIWAXS pattern image analysis results obtained in Test Example 3.
Figure 8B:
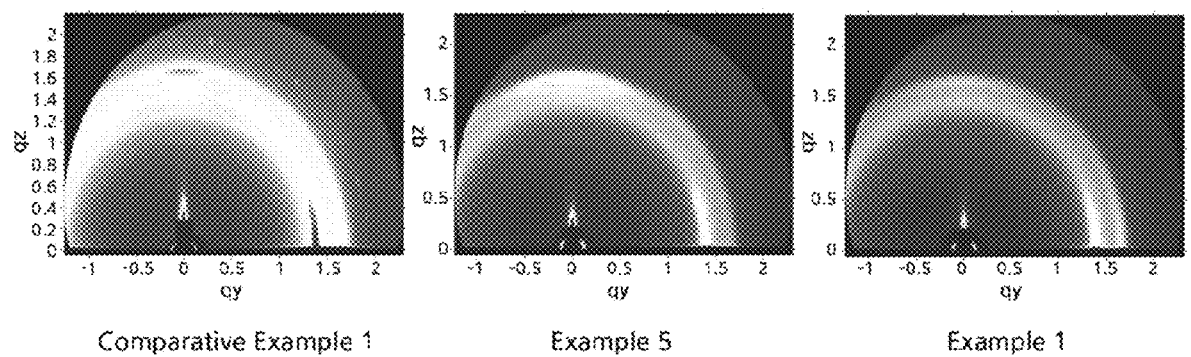
Figure 9:
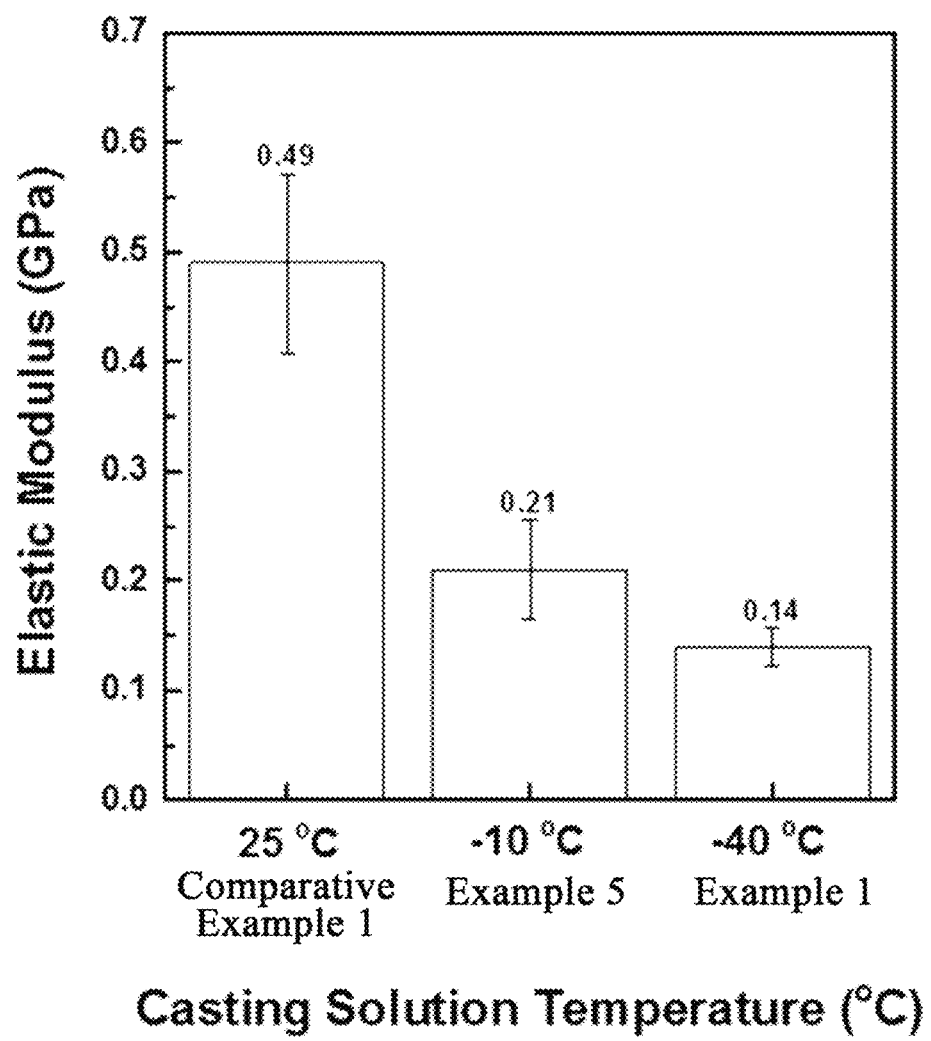
FIG. 9 shows a result of analyzing mechanical strength in Test Example 3.

The AFM images, 2D GIWAXS pattern images and mechanical strength were analyzed for the ultra-thin separation membrane of Example 1 wherein the selection layer was coated at −40° C., the ultra-thin separation membrane of Example 5 wherein the selection layer was coated at −10° C., and the ultra-thin separation membrane of Comparative Example 1 wherein the selection layer was coated at room temperature (25° C.). The AFM images (a) and the 2D GIWAXS pattern images (b) are shown in FIGS. 8A and 8B, and the result of analyzing the mechanical strength is shown in FIG. 9.

It was observed from the AFM images that the ultra-thin separation membrane of Example 1 wherein the PEBAX solution was coated at −40° C. and the ultra-thin separation membrane of Example 5 wherein it was coated at −10° C. showed much lower density of polymer crystals in the selection layer as compared to the ultra-thin separation membrane of Comparative Example 1 wherein the coating was performed at room temperature (25° C.). It was observed from the 2D GIWAXS pattern images that the crystallinity and orientation of the polymer were decreased.

It was also confirmed that the mechanical strength of the thin film was decreased due to the decreased crystallinity.

Figure 10A:
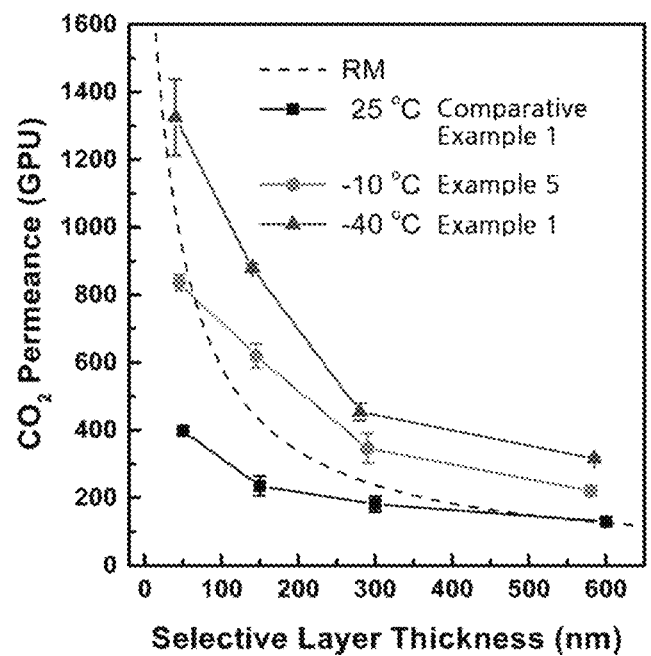
FIGS. 10A to 10D show results of evaluating the separation performance of PEBAX-based ultra-thin separation membranes in Test Example 4.
Figure 10B:
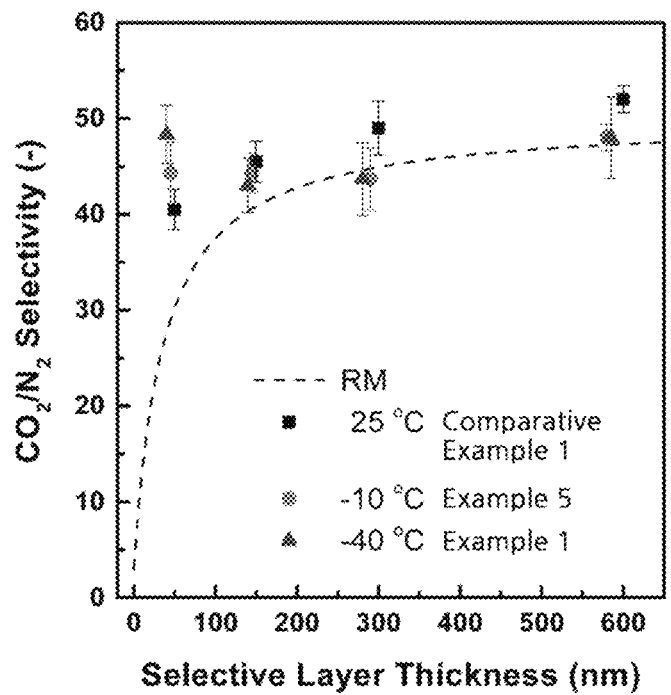
Figure 10C:
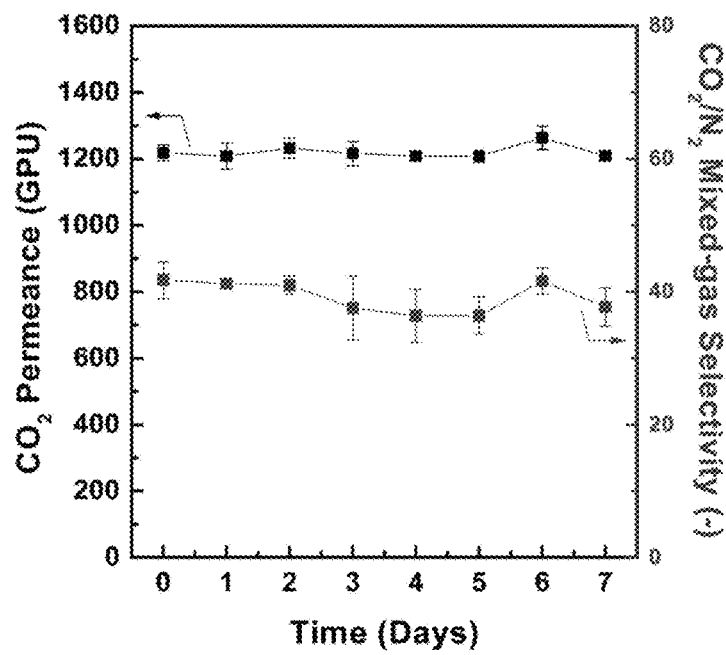
Figure 10D:
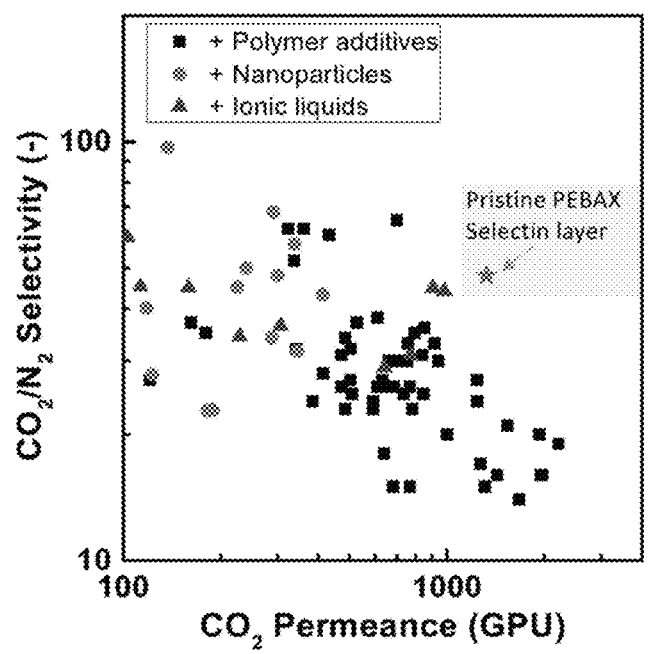

Test Example 4: Evaluation of Separation Performance of PEBAX-Based Ultra-Thin Separation Membranes The separation performance of the ultra-thin separation membrane depending on the thickness of the PEBAX selection layer and coating temperature was evaluated, and the result is shown in FIGS. 10A to 10D. FIG. 10A shows $CO_2$ permeability and FIG. 10B shows $CO_2/N_2$ selectivity. Experiment was conducted using a single gas under the condition of a pressure difference of 1 bar at 35° C. with a membrane area of 1.13 cm$^2$. The dotted curves show the separation performance of the ultra-thin separation membrane depending on thickness predicted with the resistance model (RM) using the separation performance of a PEBAX thick-film membrane. FIG. 10C shows the separation stability for $CO_2/N_2$ mixture gas ($CO_2$:N2=50:50) of the PEBAX-based ultra-thin separation membrane of Example 1, wherein the selection layer was coated at −40° C., measured under the condition of a pressure difference of 1 bar at 35° C. with a membrane area of 1.13 cm$^2$. FIG. 10D compares the $CO_2/N_2$ separation performance of the previously reported PEBAX-based ultra-thin separation membrane including additives and the PEBAX ultra-thin separation membrane of the present disclosure coated at low temperature (−40° C.).

The PEBAX-based ultra-thin separation membrane of Comparative Example 1 wherein the selection layer was coated at 25° C. showed much lower $CO_2$ permeability than that expected from the thick-film membrane. It is thought that this result is due to the increased crystallinity of the polymer caused by the nanoscale confinement phenomenon, as confirmed above in the AFM and GIWAXS analyses. In contrast, the ultra-thin separation membrane of Example 1 or Example 5 prepared using the low-temperature coating method showed remarkably higher $CO_2$ permeability of up to about 4 times as compared to that expected from the thick-film membrane and also showed comparable $CO_2/N_2$ selectivity. Therefore, it was confirmed that the separation performance of the ultra-thin polymer separation membrane can be improved remarkably by controlling the crystal structure of the polymer thin film. Especially, the PEBAX-based ultra-thin separation membrane of Example 1 prepared by coating at −40° C. showed high stability for $CO_2/N_2$ mixture gas with permeability and selectivity maintained above certain levels over time. In addition, the ultra-thin separation membrane according to the present disclosure showed higher $CO_2/N_2$ separation performance as compared to the conventional PEBAX nanocomposite separation membrane using additives even though no additive was used.

Although the exemplary embodiments of the present disclosure have been described above, those having ordinary knowledge in the art will be able to modify and change the present disclosure variously through addition, change, deletion, etc. without departing from the technical idea of the present disclosure described in the claims and such modifications and changes are also encompassed in the scope of the present disclosure.

INDUSTRIAL APPLICABILITY

According to a method for manufacturing an ultra-thin polymer separation membrane of the present disclosure, the crystallinity and orientation of the ultra-thin polymer separation membrane, essentially required for the scale-up of a separation membrane process and the actual application in the industry, can be controlled easily using a low-temperature coating method, in which the temperature of the polymer solution is lowered, during the coating of the selection layer. Furthermore, separation performance can be enhanced remarkably by using only polymers as raw materials, without additional additives that have been used in the manufacturing of conventional ultra-thin polymer separation membranes.

An ultra-thin polymer separation membrane manufactured according to the method for manufacturing an ultra-thin polymer separation membrane of the present disclosure may be applied to various separation processes such as carbon dioxide capture before and after combustion (carbon dioxide/nitrogen), natural gas purification (carbon dioxide/methane), petrochemical processes (olefin/paraffin), petrochemical purification technologies, reverse osmosis seawater desalination technologies, etc. to remarkably enhance separation performance and can reduce energy used in the separation processes.

The invention claimed is:

1. An ultra-thin polymer separation membrane comprising:
    a porous polymer support layer;
    a gutter layer formed on the porous polymer support layer; and
    a semi-crystalline polymer selection layer formed on the gutter layer,
    wherein the semi-crystalline polymer selection layer is coated with a nanometer-level thickness in a state in which a temperature of a semi-crystalline polymer solution is 0° C. to −50° C.

2. The ultra-thin polymer separation membrane according to claim 1, wherein the ultra-thin polymer separation membrane is used for any one selected from an electronic device, an electrode, a packaging and a sensor.

3. A method for manufacturing an ultra-thin polymer separation membrane, comprising a step of coating a semi-crystalline polymer selection layer formed with a nanometer-level thickness by controlling a temperature of a semi-crystalline polymer solution to 0° C. to −50° C.

4. The method for manufacturing the ultra-thin polymer separation membrane according to claim 3, wherein the temperature of the semi-crystalline polymer solution is controlled to −5° C. to −45° C.

5. The method for manufacturing the ultra-thin polymer separation membrane according to claim 3, wherein a crystallinity and an orientation of a semi-crystalline polymer are controlled by controlling the temperature of the semi-crystalline polymer solution within the range.

6. The method for manufacturing the ultra-thin polymer separation membrane according to claim 3, wherein a concentration of the semi-crystalline polymer solution is controlled to 0.5-5 wt %.

7. The method for manufacturing the ultra-thin polymer separation membrane according to claim 3, wherein the selection layer formed with the nanometer-level thickness has a thickness of 20-1000 nm.

8. The method for manufacturing the ultra-thin polymer separation membrane according to claim 3, the method further comprising:
    a step of preparing a porous support with a gutter layer formed by coating the gutter layer on a porous polymer support; and a step of forming the semi-crystalline polymer selection layer by coating the semi-crystalline polymer solution on the gutter layer.

9. The method for manufacturing the ultra-thin polymer separation membrane according to claim 3, wherein a semi-crystalline polymer is based on any one selected from a polyamide, a polystyrene, a polyolefin, a polyester and a polyurethane.

10. The method for manufacturing the ultra-thin polymer separation membrane according to claim 9,
   wherein the polyamide-based semi-crystalline polymer has a hard segment selected from any one of polyamide 6, polyamide 66, polyamide 610, polyamide 612, polyamide 11 and polyamide 12, and
   a soft segment selected from any one of polyethylene glycol, polypropylene glycol, polytetramethylene glycol and polycaprolactone polyol.

11. The method for manufacturing the ultra-thin polymer separation membrane according to claim 9, wherein the polyamide-based semi-crystalline polymer is any one selected from a thermoplastic elastomer, a thermoplastic resin, a transparent polyamide, diamide-PAE, a polyamide resin and a polyamide elastomer.

12. A gas separation system comprising the ultra-thin polymer separation membrane according to claim 1.

13. A water treatment system comprising the ultra-thin polymer separation membrane according to claim 1.

14. A gas separation system comprising the ultra-thin polymer separation membrane according to claim 2.

15. A water treatment system comprising the ultra-thin polymer separation membrane according to claim 2.

\* \* \* \* \*